United States Patent
Xie

(10) Patent No.: US 9,671,274 B1
(45) Date of Patent: Jun. 6, 2017

(54) METHOD AND APPARATUS FOR PREVENTING BLEEDING, STRETCHING OR SMEARING IN THE MANUFACTURING OF QUARTZ SLABS

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

(21) Appl. No.: 15/424,508

(22) Filed: Feb. 3, 2017

(51) Int. Cl.
*G01G 17/00* (2006.01)
*B25J 9/16* (2006.01)
*B25J 15/00* (2006.01)
*G05B 19/402* (2006.01)

(52) U.S. Cl.
CPC ............ *G01G 17/00* (2013.01); *B25J 9/1694* (2013.01); *B25J 15/0019* (2013.01); *G05B 19/402* (2013.01); *G05B 2219/31269* (2013.01); *G05B 2219/37357* (2013.01)

(58) Field of Classification Search
CPC ..... G01G 17/00; B25J 9/1694; B25J 15/0019; G05B 19/402; G05B 2219/31269; G05B 2219/37357
See application file for complete search history.

(56) References Cited

U.S. PATENT DOCUMENTS

| | | | | |
|---|---|---|---|---|
| 3,990,212 A | * | 11/1976 | Flodin | B65B 1/32 141/83 |
| 4,388,975 A | * | 6/1983 | Hirano | G01G 13/00 177/25.18 |
| 4,466,500 A | * | 8/1984 | Mosher | G01G 19/393 177/1 |
| 4,484,645 A | * | 11/1984 | Inoue | G01G 19/393 177/114 |
| 2011/0166696 A1 | * | 7/2011 | Nignon | B07C 5/28 700/223 |
| 2013/0341254 A1 | * | 12/2013 | Bauer | B07C 5/00 209/552 |
| 2015/0064315 A1 | * | 3/2015 | van Blokland | G01G 11/04 426/231 |
| 2016/0089818 A1 | * | 3/2016 | Xie | B29C 67/243 264/241 |
| 2016/0290852 A1 | * | 10/2016 | Chandler | G01G 19/393 |

* cited by examiner

*Primary Examiner* — Natalie Huls
(74) *Attorney, Agent, or Firm* — Walter J. Tencza, Jr.

(57) ABSTRACT

An apparatus including a computer processor, a robotic device, and a weight scale device, having a plurality of independent weight scales. The computer processor may be programmed to control the robotic device to cause a material located on the weight scale device to be evenly distributed over the plurality of independent weight scales so that each of the plurality of independent weight scales indicates the same weight within a tolerance. The robotic device may include a rake appendage having a plurality of tines, which may be controlled by the computer processor to move the material to cause the material to be evenly distributed over the plurality of independent weight scales. The robotic device may include a roller device having a roller which may be controlled by the computer processor to run over the material located on the weight scale device to thereby compress the material.

20 Claims, 14 Drawing Sheets

METHOD AND APPARATUS FOR PREVENTING BLEEDING, STRETCHING OR SMEARING IN THE MANUFACTURING OF QUARTZ SLABS

FIELD OF THE INVENTION

This invention relates to improved methods and apparatus concerning the manufacturing of quartz slabs.

BACKGROUND OF THE INVENTION

In the manufacturing of quartz slabs, the quartz composite material (composed of quartz, resin, catalysts, etc) is pressed into the shape of a slab using a press machine. Press machines utilize large amounts of mechanical pressure in a vacuum. This is to ensure uniformity and to eliminate any potential air pockets within the material. Due to the different particle sizes of the composite material, uneven distribution of quartz composite material in the mold by weight per unit area will occur. Some areas have a higher density than other areas, even if the material visually appears to be leveled on the surface. This causes the quartz composite material to be squeezed from the areas of high density to areas of low density during the press process. In the production of marbleized quartz slabs that have a large degree of sharp color variation, this can cause the end product to appear smeared.

SUMMARY OF THE INVENTION

In at least one embodiment, effects, colloquially referred to as bleeding, stretching or smearing is reduced or inhibited in the manufacturing of quartz slabs. In at least one embodiment, in order to prevent these effects, electronic and/or digital weight scales are arranged in a two dimensional array or grid on a level surface in a mold cavity or area. The edge of each scale is almost flush with the edge of each neighboring scale. A small gap is present between the scales so each scale will not interference with the adjacent ones. The array may include a varying number of scales or grid cells based on the accuracy desired, for example, each scale or grid may be eight inches by eight inches in a sixty-four inch by one hundred and twenty-eight inch mold cavity area. In this example there would be one hundred and twenty-eight scales.

Each scale communicates with a central computer processor, such as via hardwired or wireless communications links. The end objective is to manipulate the quartz composite material placed on the scales so that the weight is evenly distributed between each scale of the two dimensional array or grid of scales.

In at least one embodiment, initially a sheet of paper, plastic or similar material is placed across the scales. A rectangular mold frame is lowered onto the sheet so that the edges of the outermost scales are coincident with the inner edges of the mold frame. Quartz composite material is distributed onto the sheet. The central computer processor controls a robotic arm which manipulates the composite material using a rake appendage so that each scale in the two dimensional array or grid measures the same weight within a specified tolerance. The robotic arm then changes appendages to a roller, such as by rotating a device to which the roller and rake tines or prongs are connected. The roller is run along the edges of the quartz composite material in order to slightly compress the composite material. This is done so that when the mold frame is lifted, the quartz composite material at the edge of the mold frame remains relatively intact and doesn't spill over. The mold frame is then raised and the composite material on the sheet is transferred on a conveyor belt in to a press machine.

In at least one embodiment an apparatus is provided comprising a computer processor, a robotic device, and a weight scale device having a plurality of independent weight scales. The computer processor may be programmed to control the robotic device to cause a material located on the weight scale device to be evenly distributed over the plurality of independent weight scales so that each of the plurality of independent weight scales indicates the same weight within a tolerance.

In at least one embodiment, the robotic device includes a rake appendage having a plurality of tines. The plurality of tines of the rake appendage may be configured with respect to the weight scale device, so that the plurality of tines are adapted to be used in response to control by the computer processor to move the material to cause the material to be evenly distributed over the plurality of independent weight scales.

The robotic device may include a roller device having a roller which is configured with respect to the weight scale device so that the roller is adapted to be used in response to control by the computer processor to run over the material located on the weight scale device to thereby compress the material.

The apparatus may further include a conveyor device; and the conveyor device may be configured to receive material from the weight scale device. The apparatus may further include a hydraulic device; and the hydraulic device may be configured to raise and lower a frame in response to control by the computer processor. The frame may surround the plurality of independent weight scales so that the material lies on the plurality of independent weight scales and within a region defined by the frame. The hydraulic device may be comprised of four members located at four corners of the frame, wherein the four members raise and lower the frame in response to control by the computer processor.

In at least one embodiment, a method is provided comprising the step of using a computer processor to control a robotic device to cause a material located on a weight scale device to be evenly distributed over a plurality of independent weight scales so that each of the plurality of independent weight scales indicates the same weight within a tolerance.

The robotic device may include a rake appendage having a plurality of tines; and the method may further include using the computer processor to cause the rake appendage and the plurality of tines to move the material to cause the material to be evenly distributed over the plurality of independent weight scales.

The robotic device may include a roller device having a roller; the method may further include using the computer processor to cause the roller device to cause the roller to run over the material located on the weight scale device to thereby compress the material. The method may further include receiving the material at a conveyor device from the weight scale device.

The method may further include using the computer processor to control a hydraulic device to raise and lower a frame; wherein the frame surrounds the plurality of independent weight scales so that the material lies on the plurality of independent weight scales and within a region defined by the frame. The hydraulic device may be comprised of four members located at four corners of the frame, wherein the four members raise and lower the frame in response to control by the computer processor.

DETAILED DESCRIPTION OF THE DRAWINGS

Figure 1:
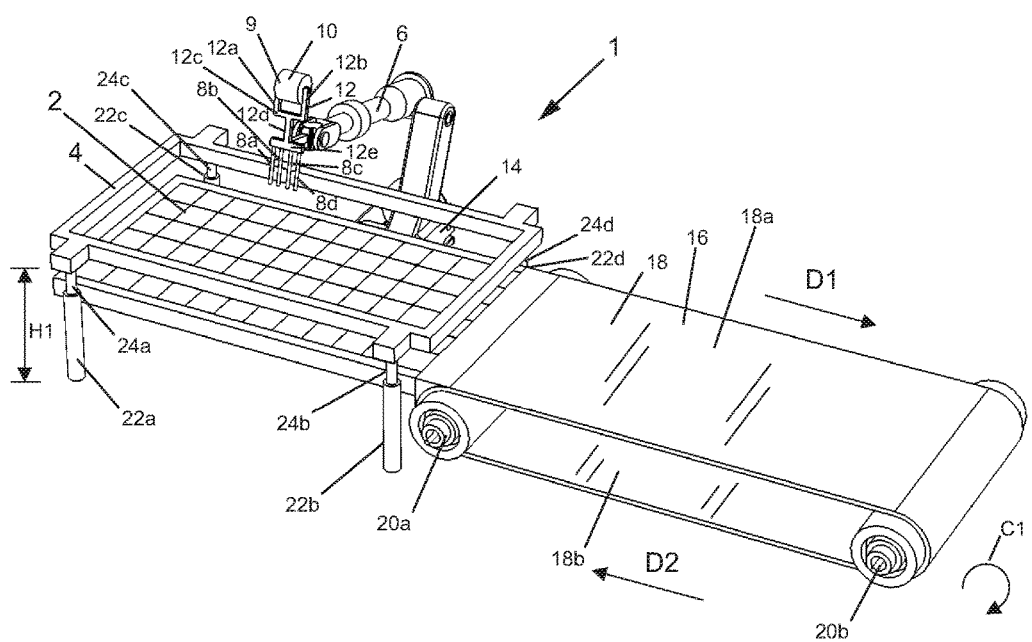
FIG. 1 shows a top, front, and right perspective view of an apparatus in accordance with an embodiment of the present invention, with the apparatus of FIG. 1 in a first state.
Figure 8:
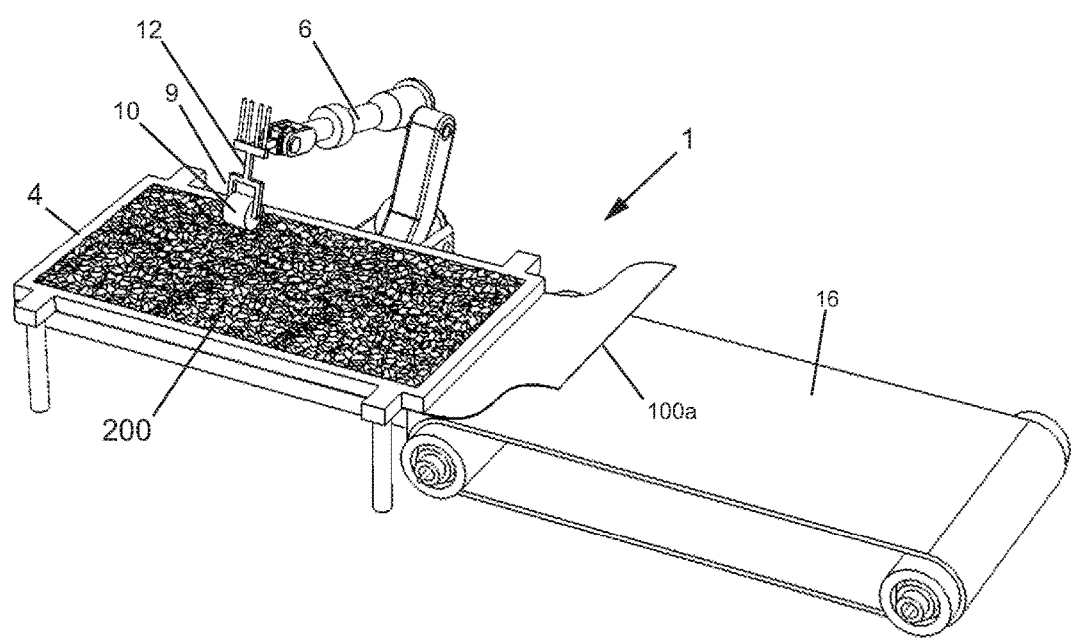
FIG. 8 shows the apparatus of FIG. 1 in an eighth state in which the robotic arm rotates position in order to use a second appendage, a roller.

FIG. 1 shows a top, front, and right perspective view of an apparatus 1 in accordance with an embodiment of the present invention, with the apparatus 1 in a first state. The apparatus 1 includes an array of electronic and/or digital weight scales 2, a mold frame 4, a robotic arm 6, and a device 9. The device 9 includes rigid prongs or tines 8a, 8b, 8c, and 8d, roller 10, and a rigid member 12, such as a hard plastic or hard metal member having member portions, or sections 12a, 12b, 12c, 12d, and 12e. The member sections 12e and prongs 8a-8d form a rake appendage. The roller 10 is rotatably mounted to the members or sections 12a and 12b. The member or section 12e is rotatably mounted to the robotic arm 6 so that the positions of the roller 10 and the prongs 8a-d can be changed, as shown by FIG. 1 and FIG. 8.

Each scale of the array of electronic and/or digital weight scales 2 may be a fixed rectangular member made of a rigid material, such as a stainless steel plate. Each scale of scales 2 may move and measure weight independently of every other scale of scales 2.

The robotic arm 6 is connected to a base 14 which may include a central processor or computer processor 304 (shown in simplified form in block diagram of FIG. 14) which is electronically connected by communications links, such as hardwired or wireless communications links, to the robotic arm 6 for controlling move of the robotic arm 6 and rotation of the section or member 12e to change positions of the roller 10 and prongs 8a-d.

The apparatus 1 includes conveyor device 16, which may include conveyor belt 18, and rollers 20a and 20b. The conveyor device 16 may be controlled by the computer processor 304 (shown in FIG. 14). At a particular instant of time, there is a top part 18a and a bottom part 18b of the belt 18. The top part 18a moves in the direction D1 and the bottom part 18b moves in the direction D2 as the rollers 20a and 20b, rotate clockwise, in the direction C1. Gradually as the belt 18 rotates, the top part 18a gradually becomes the bottom part and the bottom part 18b gradually becomes the top part.

The mold frame 4 is fixed at four corners to cylindrical solid members 24a, 24b, 24c, and 24d which are controlled, by the central computer processor 304 to be inserted to a greater or lesser extent, telescopically, into hollow cylindrical members or legs 22a, 22b, 22c, and 22d, respectively, to control the height or distance of the mold frame 4 above the bottom of the legs 22a-22d. For example, the height or distance of the mold frame 4 above the bottom of the legs 22a-22d in FIG. 1 is H1 which is greater than the H2, which is greater than the height or distance of the mold frame 4 above the bottom of the legs 22a-22d in FIG. 3. The members 24a-24d may be four hydraulic cylinders controlled by the central computer processor 304 and connected to the mold frame 4. The members or hydraulic cylinders 24a-d are controlled by the computer processor 304 to raise or lower the mold frame 4.

Figure 2:
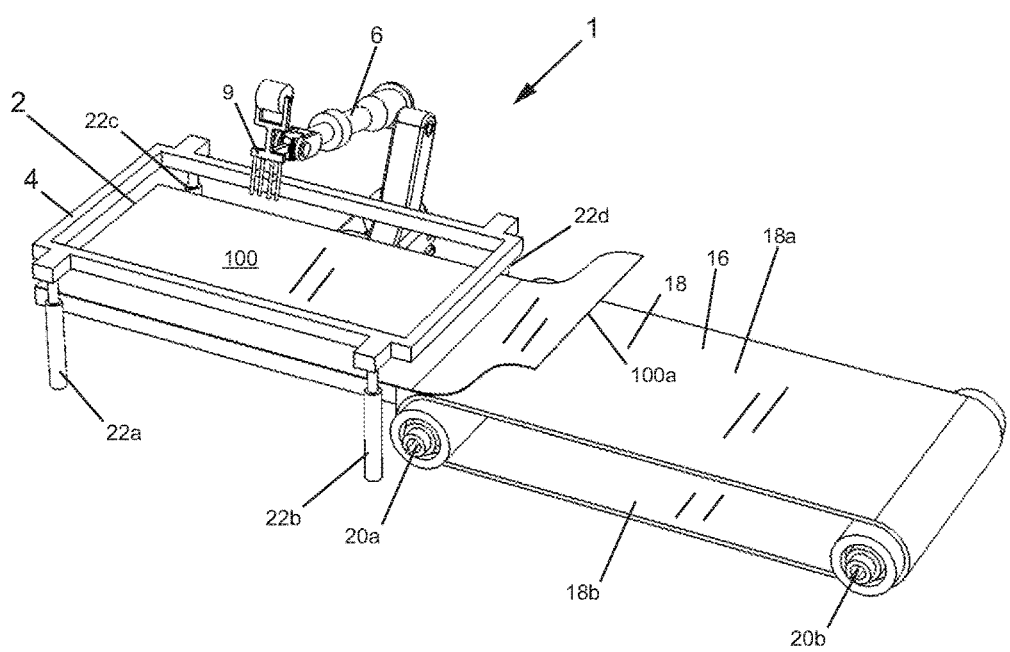
FIG. 2 shows the apparatus of FIG. 1 in a second state, in which a sheet of paper is placed over an array of scales of the apparatus of FIG. 1.

FIG. 2 shows the apparatus 1 in a second state, in which a sheet of paper 100 is placed over the array of electronic and/or digital weight scales 2 of the apparatus 1.

Figure 3:
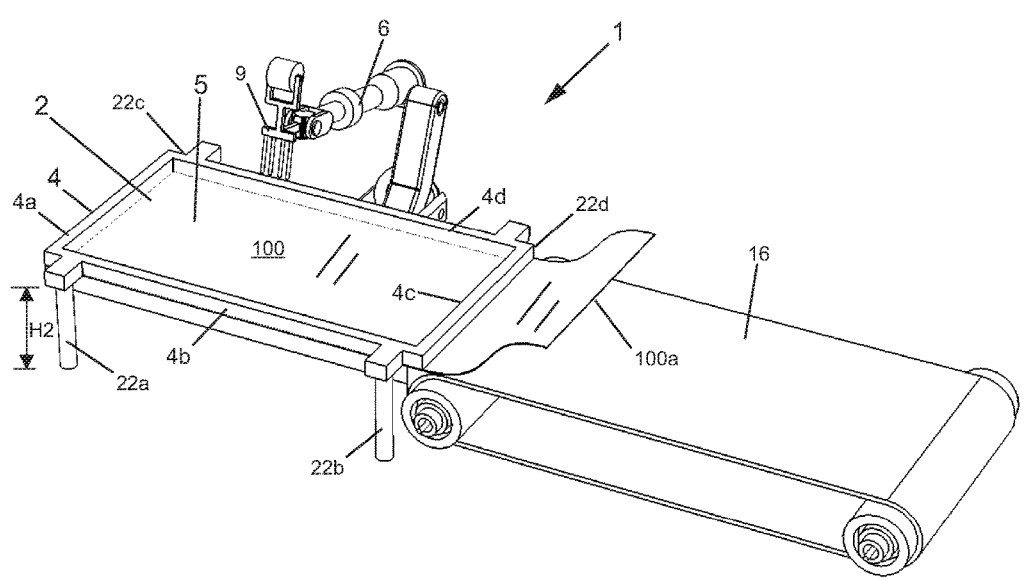
FIG. 3 shows the apparatus of FIG. 1 in a third state in which a mold frame is lowered, creating a cavity for a quartz composite material to be distributed.

FIG. 3 shows the apparatus of FIG. 1 in a third state in which a mold frame 4 is lowered, creating a cavity 5 for a quartz composite material 200 (shown in FIG. 4) to be distributed. The cavity 5 is enclosed by sides 4a, 4b, 4c, and 4d of the mold frame 4, has an opening at the top, and at the bottom is located paper 100 resting on scales or member 2.

Figure 4:
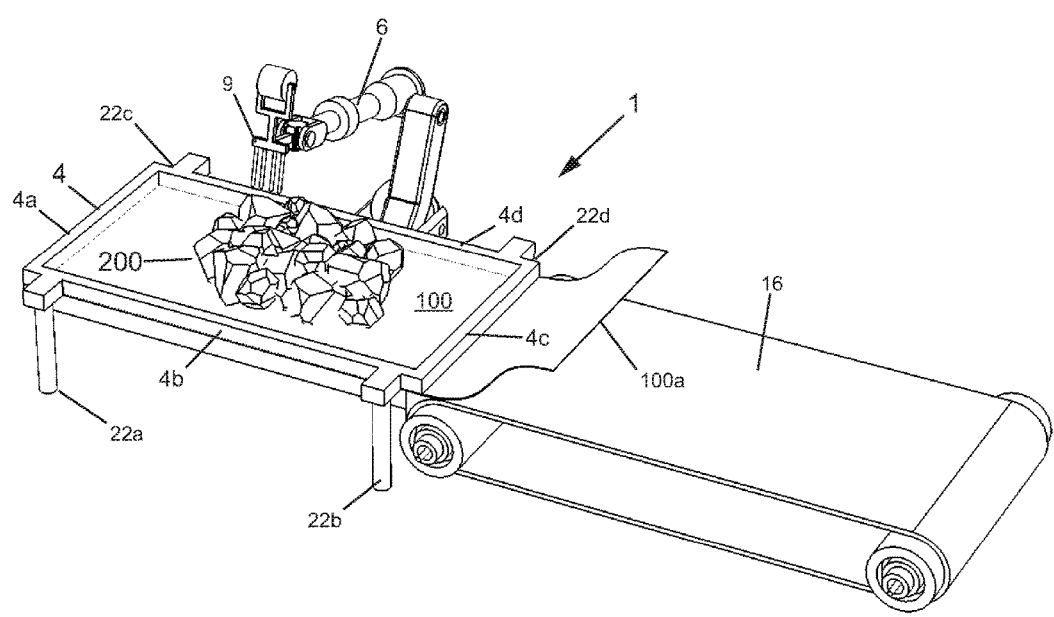
FIG. 4 shows the apparatus of FIG. 1 in a fourth state in which the quartz composite material is distributed onto the paper over the array of scales.

FIG. 4 shows the apparatus 1 of FIG. 1 in a fourth state in which the quartz composite material 200 is distributed onto the paper 100 over the array of scales or member 2.

Figure 5:
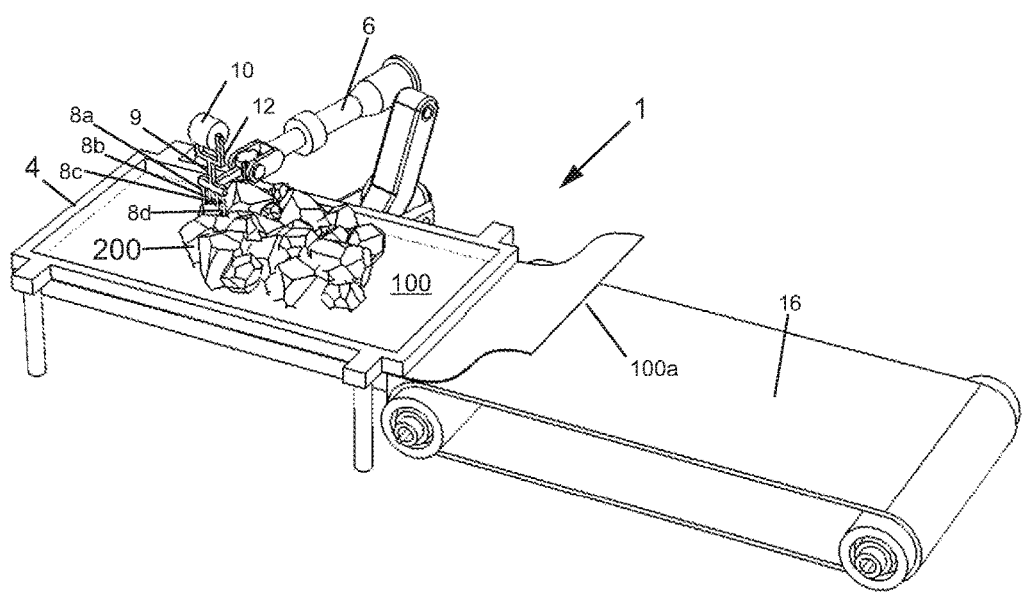
FIG. 5 shows the apparatus of FIG. 1 in a fifth state in which a central processor of the apparatus of FIG. 1, shown in a block diagram in FIG. 14, positions a rake appendage of a robotic arm of a robotic device of the apparatus of FIG. 1 over the quartz composite material.
Figure 14:
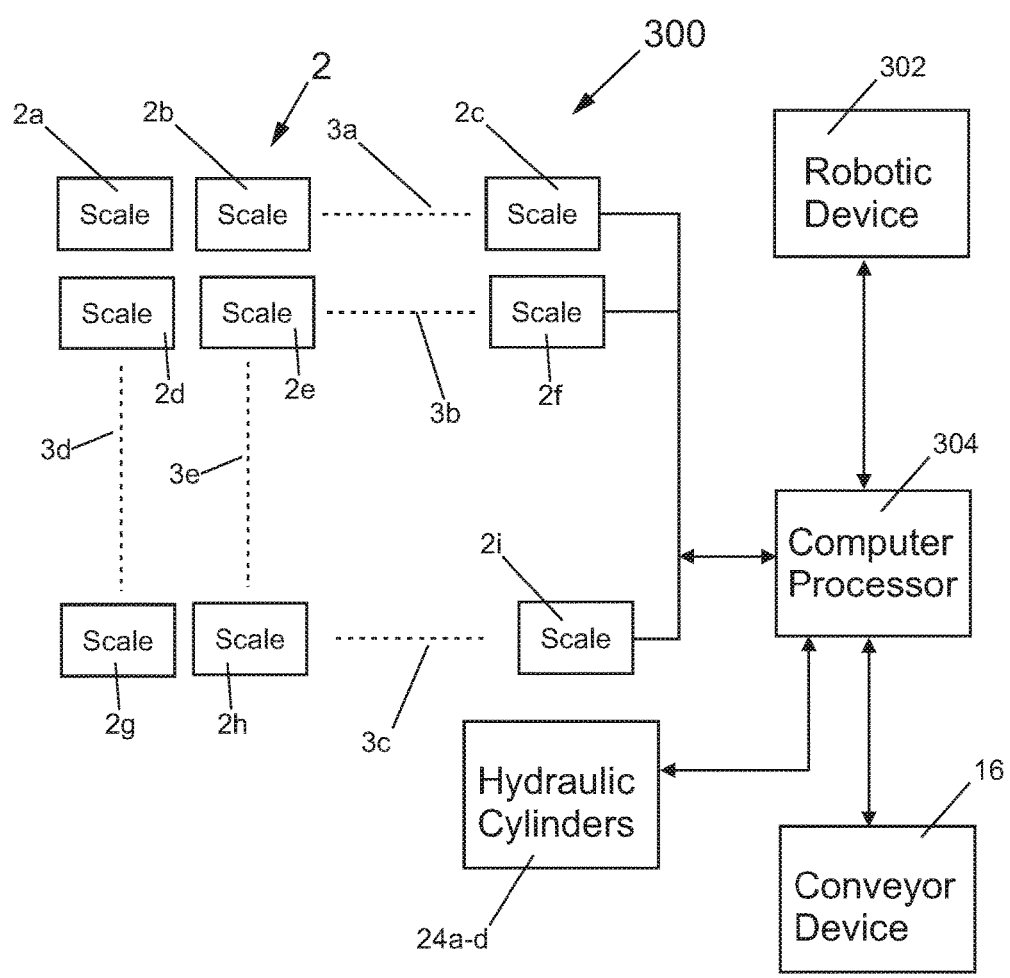
FIG. 14 shows a block diagram concerning communication between the central processor and the scales, the robotic device, the hydraulic cylinders or devices, and the conveyor device of the apparatus of FIG. 1.

FIG. 5 shows the apparatus 1 of FIG. 1 in a fifth state in which a central computer processor 304 shown in a block diagram in FIG. 14 orients and positions device 9 using robotic arm 6 so that prongs or tines 8a-8d are engaged in the quartz composite material 200.

Figure 6:
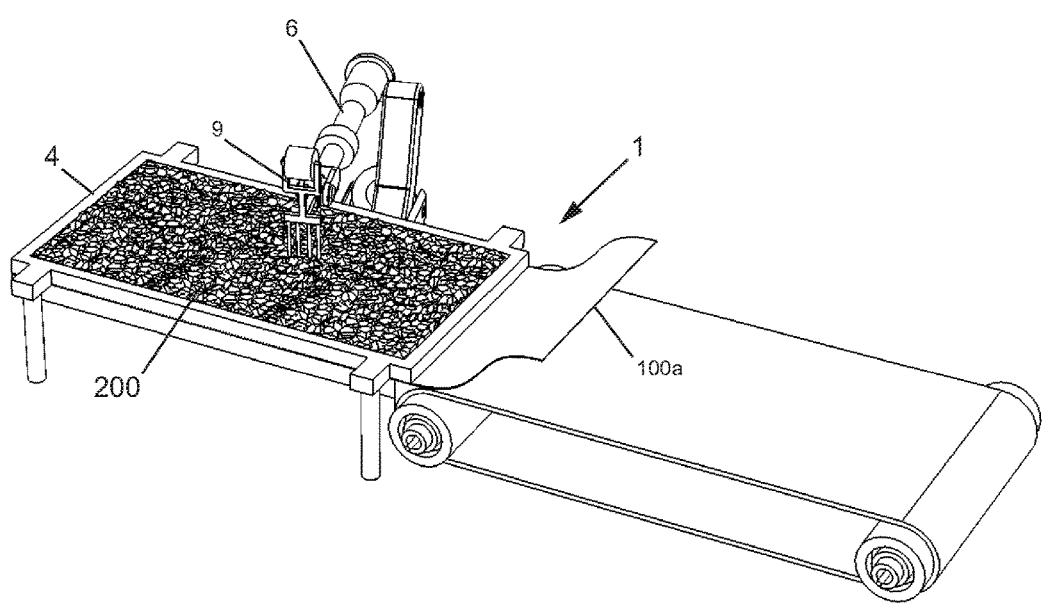
FIG. 6 shows the apparatus of FIG. 1 in a sixth state in which the central processor of the apparatus of FIG. 1 manipulates the rake appendage to move the quartz composite material so that each scale in the array measures the same weight within a specified tolerance.

FIG. 6 shows the apparatus 1 of FIG. 1 in a sixth state in which the central processor 304 of the apparatus 1 manipulates device 9 to move the quartz composite material 200 with the prongs or tines 8a-8d so that each electronic and/or digital weight scale in the array of electronic and/or digital weight scales, or grids of member 2, measures the same weight within a specified tolerance. The scale to measure weight of member 2 may communicate electronically with the computer processor number 304 shown in FIG. 14.

Figure 7:
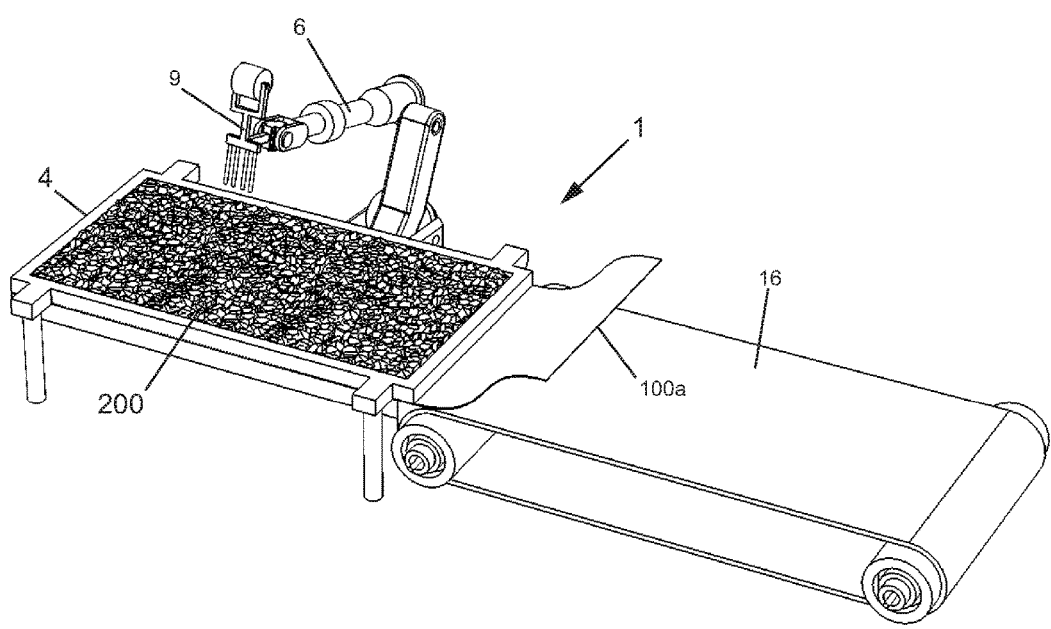
FIG. 7 shows the apparatus of FIG. 1 in a seventh state in which the robotic arm is raised over the manipulated quartz composite material.

FIG. 7 shows the apparatus 1 in a seventh state in which the robotic arm 6 is raised over the manipulated quartz composite material.

FIG. 8 shows the apparatus 1 of FIG. 1 in an eighth state in which the robotic arm 6 rotates position in order to use a roller 10 of the device 9.

Figure 9:
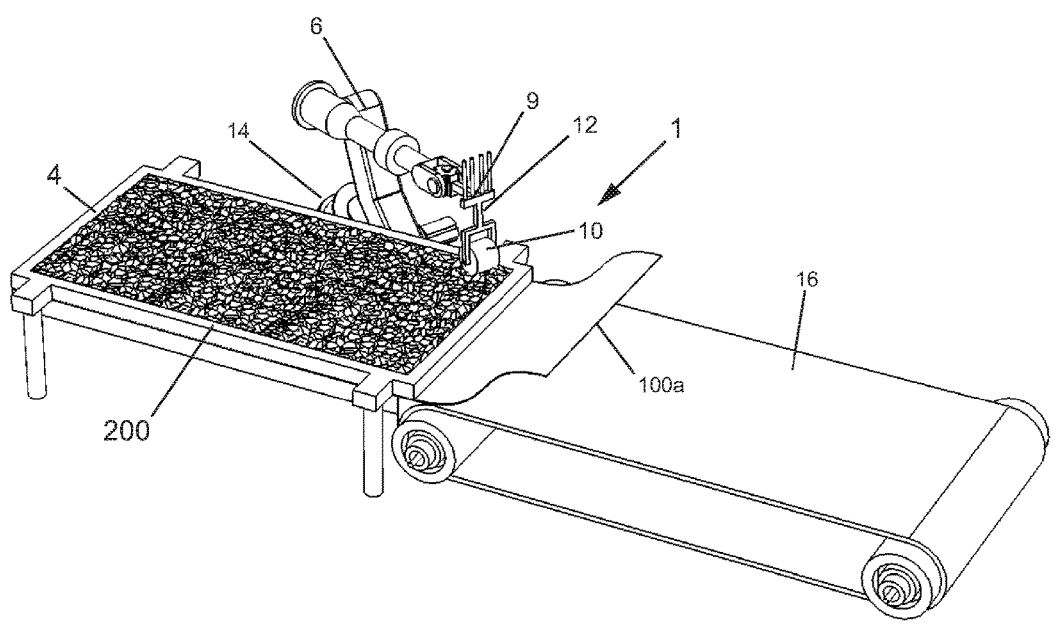
FIG. 9 shows the apparatus of FIG. 1 in a ninth state in which the roller is ran over the manipulated quartz composite material along the edges of the mold frame, slightly compressing the manipulated quartz composite material so that when the mold frame is raised the manipulated quartz composite material keeps the shape of the mold.

FIG. 9 shows the apparatus 1 of FIG. 1 in a ninth state in which the roller 10 is run over the manipulated quartz composite material 200 along the edges of the mold frame 4, slightly compressing the manipulated quartz composite material 200 so that when the mold frame 4 is raised the manipulated quartz composite material 200 keeps the shape of the rectangular cavity 5 within the mold frame 4.

Figure 10:
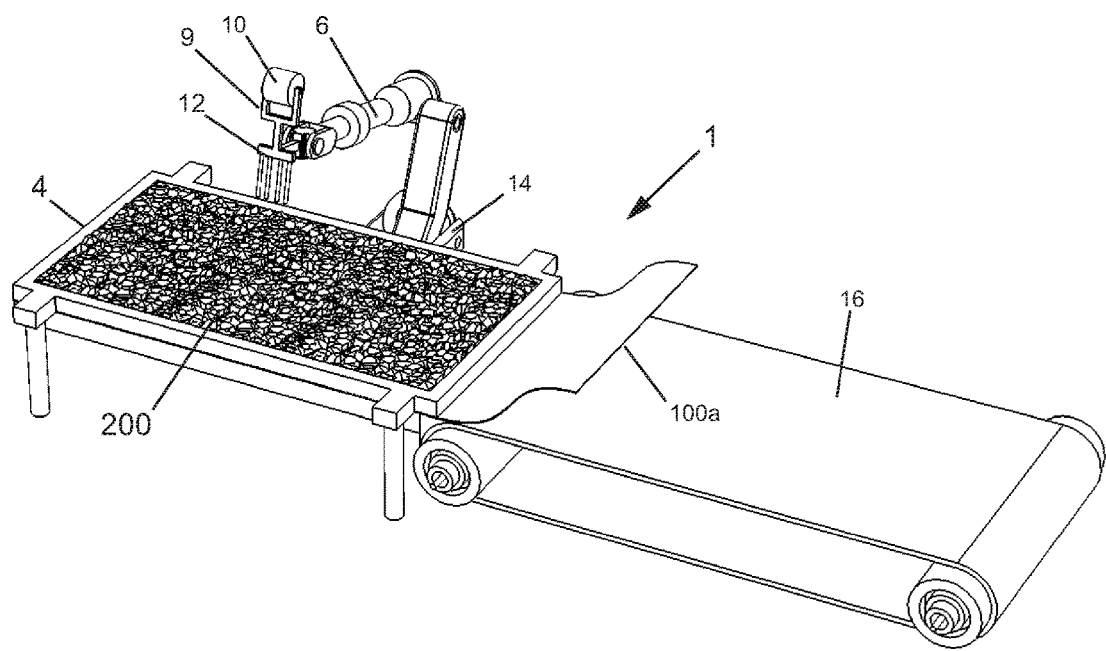
FIG. 10 shows the apparatus of FIG. 1 in a tenth state in which the robotic arm returns to the initial setup position.

FIG. 10 shows the apparatus 1 of FIG. 1 in a tenth state in which the robotic arm 6 returns to the initial setup position.

Figure 11:
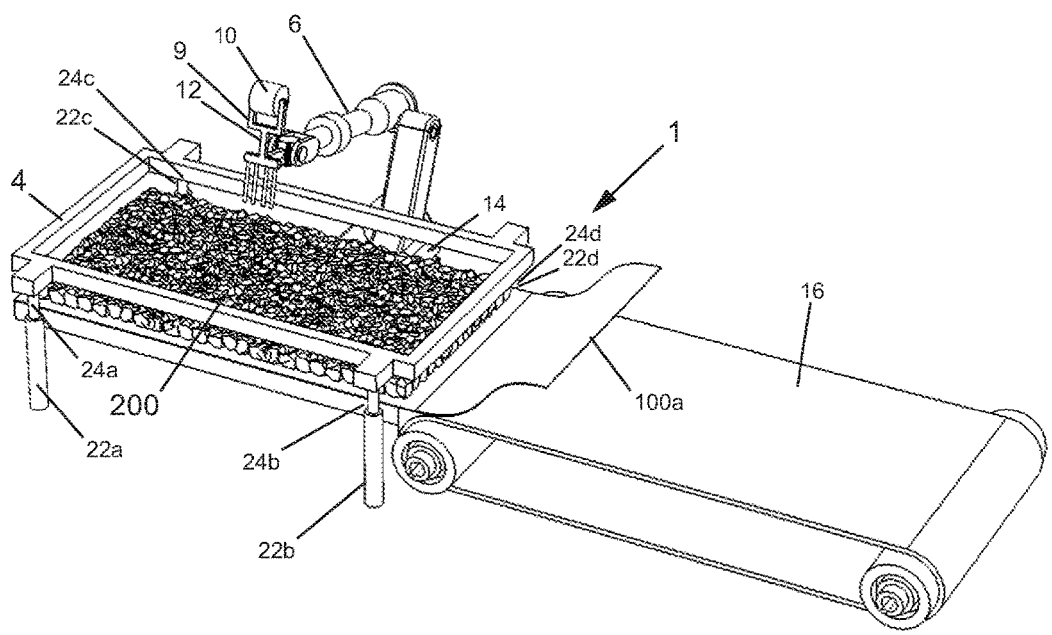
FIG. 11 shows the apparatus of FIG. 1 in a eleventh state in which the mold frame is raised.

FIG. 11 shows the apparatus 1 of FIG. 1 in a eleventh state in which the mold frame 4 is raised.

Figure 12:
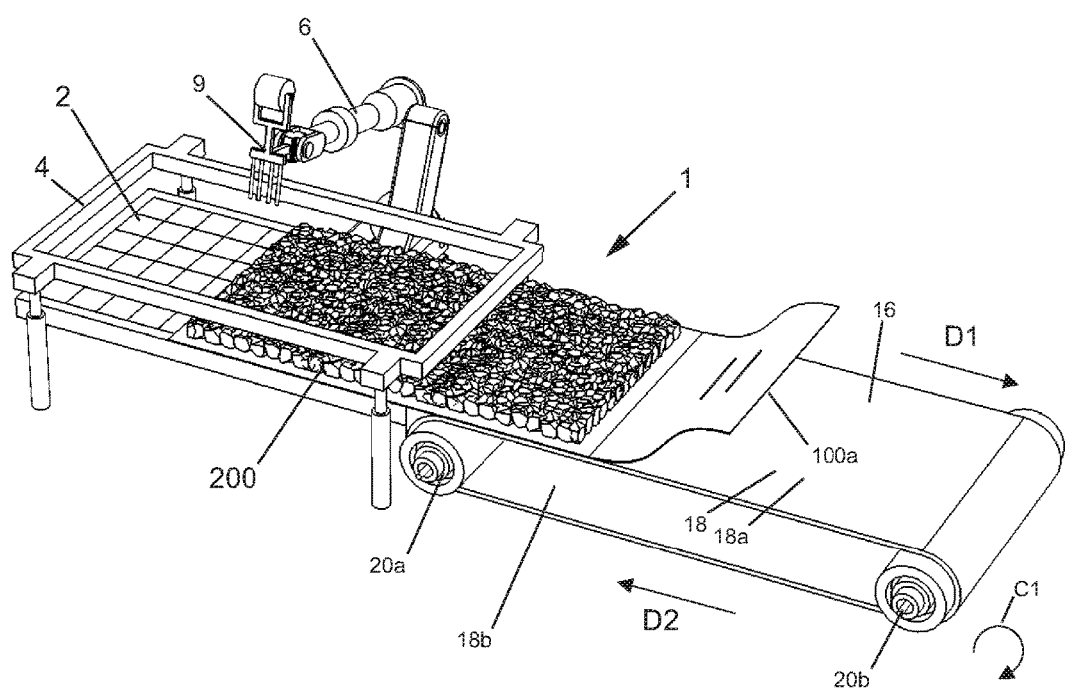
FIG. 12 shows the apparatus of FIG. 1 in a twelfth state in which the sheet of paper is pulled onto the conveyor belt.

FIG. 12 shows the apparatus 1 of FIG. 1 in a twelfth state in which the sheet of paper 100 is pulled onto the conveyor belt 18 of the device 16, such that an edge 100*a* of the paper 100 has been moved from FIG. 11 to FIG. 12.

Figure 13:
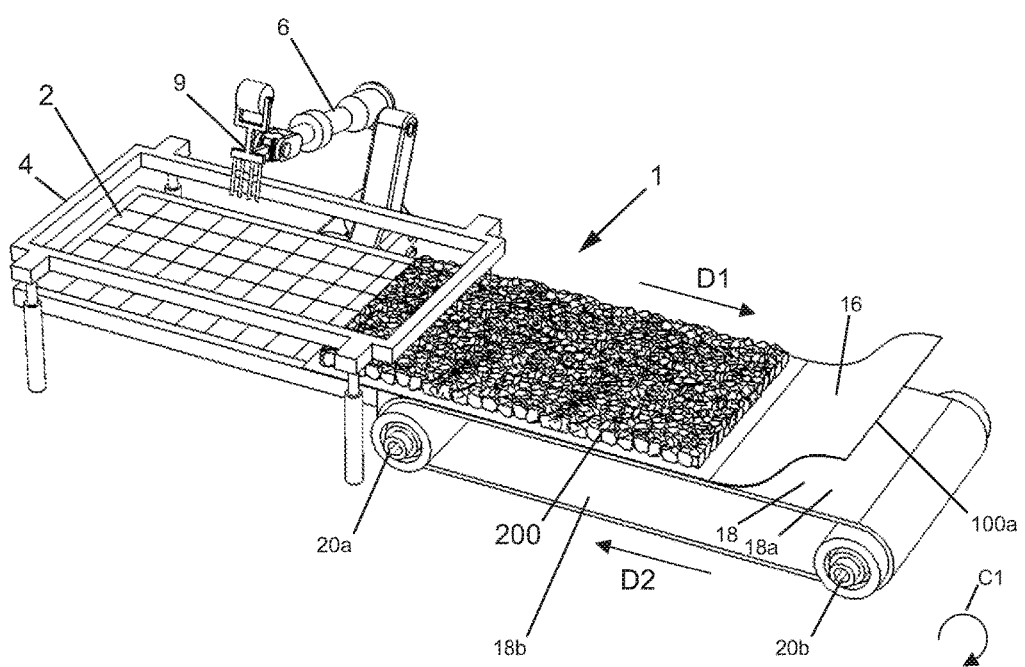
FIG. 13 shows the apparatus of FIG. 1 in a thirteenth state in which the quartz composite material is sent to a press machine for further process.

FIG. 13 shows the apparatus 1 of FIG. 1 in a thirteenth state in which the quartz composite material 200 is sent to a press machine for further process.

FIG. 14 shows a block diagram 300 concerning communication between of the scales 2, the central processor 304, the robotic device 302, and the conveyor device 16 of the apparatus of FIG. 1. The scales 2 may include scales 2*a*, 2*b*, 2*c*, 2*d*, 2*e*, 2*f*, 2*g*, 2*h*, and 2*i*, and any number of further scales, as shown by dotted lines 3*a*, 3*b*, 3*c*, 3*d*, and 3*e*, typically arranges in a grid or two dimensional array having a certain number of columns and rows. Each scale of scales 2 communicates with the computer processor 304, such as via hardwired or wireless communications links. The computer processor 304 receives out signals from each of scales 2 and can determine the weight on each of scales 2. The computer processor 304 can also turn each of scales 2 on and off. The computer processor 304 may include computer memory, in which a computer program is stored which may be programmed to sum up all of the weights of the scales 2 and store this in computer memory or which may be store the individual weights of each of the scales in an array in computer memory.

The computer processor 304 also communicates with the conveyor device 16 to control movement of the belt 18 via rollers 20*a* and 20*b*. The computer processor 304 also communicates with the robotic device 302 to control movements of components of the robotic device 302, such as movements of the robotic arm 6 and rotation of the section or member 12*e* to change positions of the roller 10 and prongs 8*a-d*. The robotic device 302 may include the robotic arm 6, the member 12*e*, the roller 10, the prongs 8*a-d*, the device 9, and the base 14. The robotic device 302 may be described as including the computer processor 304.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a computer processor;
a robotic device; and
a weight scale device having a plurality of independent weight scales; and
wherein the computer processor is programmed to control the robotic device to manipulate a material located on the weight scale device, while the material is on the weight scale device, from a first state in which the material is not distributed evenly over the plurality of independent weight scales within a tolerance to a second state in which the material is evenly distributed over the plurality of independent weight scales within a tolerance.

2. The apparatus of claim 1 wherein
the robotic device includes a roller device having a roller which is configured with respect to the weight scale device so that the roller is adapted to be used in response to control by the computer processor to run over the material located on the weight scale device to thereby compress the material.

3. The apparatus of claim 1 wherein
the computer processor is programmed to control the robotic device to manipulate the material located on the weight scale device, while the material is on the weight scale device, from the first state in which the material is not distributed evenly over the plurality of independent weight scales within a tolerance to the second state in which the material is evenly distributed over the plurality of independent weight scales within a tolerance, by moving at least part of the material from a first location on the weight scale device to second location on the weight scale device, different from the first location, while the at least part of the material is on the weight scale device.

4. The apparatus of claim 3 wherein
the robotic device includes a rake appendage having a plurality of tines and the rake appendage is controlled by the computer processor to move the at least part of the material from the first location on the weight scale device to the second location on the weight scale device, by causing the plurality of tines to engage and move the at least part of the material, while the at least part of the material is on the weight scale device.

5. The apparatus of claim 1 further comprising
a mold frame defining an inner region;
wherein the computer processor is programmed to control the robotic device to manipulate the material located on the weight scale device, while the material is on the weight scale device, from the first state in which the material is not distributed evenly over the plurality of independent weight scales within a tolerance to the second state in which the material is evenly distributed over the plurality of independent weight scales within a tolerance, by causing the material to be distributed over the entire inner region of the mold frame.

6. The apparatus of claim 5 wherein
the mold frame has one or more inner edges,
the plurality of independent weight scales include a plurality of outermost scales each of which has an edge which is coincident with one of the one or more inner edges of the mold frame.

7. A method comprising
programming a computer processor to control a robotic device to cause a material located on a weight scale device to be evenly distributed over a plurality of independent weight scales so that each of the plurality of independent weight scales indicates the same weight within a tolerance;

wherein the computer processor is programmed to control the robotic device to manipulate the material located on the weight scale device, while the material is on the weight scale device, from a first state in which the material is not distributed evenly over the plurality of independent weight scales within a tolerance to a second state in which the material is evenly distributed over the plurality of independent weight scales within a tolerance.

8. The method of claim 7 wherein
the robotic device includes a roller device having a roller;
and further comprising using the computer processor to cause the roller device to cause the roller to run over the material located on the weight scale device to thereby compress the material.

9. The method of claim 7 wherein
the computer processor is programmed to control the robotic device to manipulate the material located on the weight scale device, while the material is on the weight scale device, from the first state in which the material is not distributed evenly over the plurality of independent weight scales within a tolerance to the second state in which the material is evenly distributed over the plurality of independent weight scales within a tolerance, by moving at least part of the material from a first location on the weight scale device to a second location on the weight scale device, which is different from the first location, while the at least part of the material is on the weight scale device.

10. The method of claim 9 wherein
the robotic device includes a rake appendage having a plurality of tines and the rake appendage is controlled by the computer processor to move the at least part of the material from the first location on the weight scale device to the second location on the weight scale device, by causing the plurality of tines to engage and move the at least part of the material, while the at least part of the material is on the weight scale device.

11. The method of claim 7 wherein
the computer processor is programmed to control the robotic device to manipulate the material located on the weight scale device, while the material is on the weight scale device, from the first state in which the material is not distributed evenly over the plurality of independent weight scales within a tolerance to the second state in which the material is evenly distributed over the plurality of independent weight scales within a tolerance, by causing the material to be distributed over an entire inner region of a mold frame.

12. The method of claim 11 wherein
the mold frame has one or more inner edges,
the plurality of independent weight scales include a plurality of outermost scales each of which has an edge which is coincident with one of the one or more inner edges of the mold frame.

13. An apparatus comprising:
a computer processor;
a robotic device; and
a weight scale device having a plurality of independent weight scales; and
wherein the computer processor is programmed to control the robotic device to cause a material located on the weight scale device to be evenly distributed over the plurality of independent weight scales so that each of the plurality of independent weight scales indicates the same weight within a tolerance;
a hydraulic device; and
wherein the hydraulic device is configured to raise and lower a frame in response to control by the computer processor; and
wherein the frame surrounds the plurality of independent weight scales so that the material lies on the plurality of independent weight scales and within a region defined by the frame.

14. The apparatus of claim 13 and wherein
the hydraulic device is comprised of four members located at four corners of the frame, wherein the four members raise and lower the frame in response to control by the computer processor.

15. A method comprising the steps of:
programming a computer processor to control a robotic device to cause a material located on a weight scale device to be evenly distributed over a plurality of independent weight scales so that each of the plurality of independent weight scales indicates the same weight within a tolerance;
using the computer processor to control a hydraulic device to raise and lower a frame;
wherein the frame surrounds the plurality of independent weight scales so that the material lies on the plurality of independent weight scales and within a region defined by the frame.

16. The method of claim 15 wherein
the hydraulic device is comprised of four members located at four corners of the frame, wherein the four members raise and lower the frame in response to control by the computer processor.

17. An apparatus comprising:
a computer processor;
a robotic device; and
a weight scale device having a plurality of independent weight scales; and
wherein the computer processor is programmed to control the robotic device to cause a material located on the weight scale device to be evenly distributed over the plurality of independent weight scales so that each of the plurality of independent weight scales indicates the same weight within a tolerance;
wherein the robotic device includes a rake appendage having a plurality of tines;
wherein the plurality of tines of the rake appendage are configured with respect to the weight scale device, so that the plurality of tines are adapted to be used in response to control by the computer processor to move the material to cause the material to be evenly distributed over the plurality of independent weight scales; and
wherein the robotic device includes a roller device having a roller which is configured with respect to the weight scale device so that the roller is adapted to be used in response to control by the computer processor to run over the material located on the weight scale device to thereby compress the material.

18. The apparatus of claim 17 further comprising
a conveyor device; and
wherein the conveyor device is configured to receive material from the weight scale device.

19. A method comprising the steps of:
programming a computer processor to control a robotic device to cause a material located on a weight scale device to be evenly distributed over a plurality of independent weight scales so that each of the plurality of independent weight scales indicates the same weight within a tolerance wherein the robotic device includes a rake appendage having a plurality of tines;

and further comprising programming the computer processor to cause the rake appendage and the plurality of tines to move the material to cause the material to be evenly distributed over the plurality of independent weight scales;

wherein the robotic device includes a roller device having a roller;

and further comprising programming the computer processor to cause the roller device to cause the roller to run over the material located on the weight scale device to thereby compress the material.

20. The method of claim 19 further comprising receiving the material at a conveyor device from the weight scale device.

* * * * *